W. A. BRAUN.
SOLDERING IRON.
APPLICATION FILED JUNE 24, 1918.
1,293,320.
Patented Feb. 4, 1919.
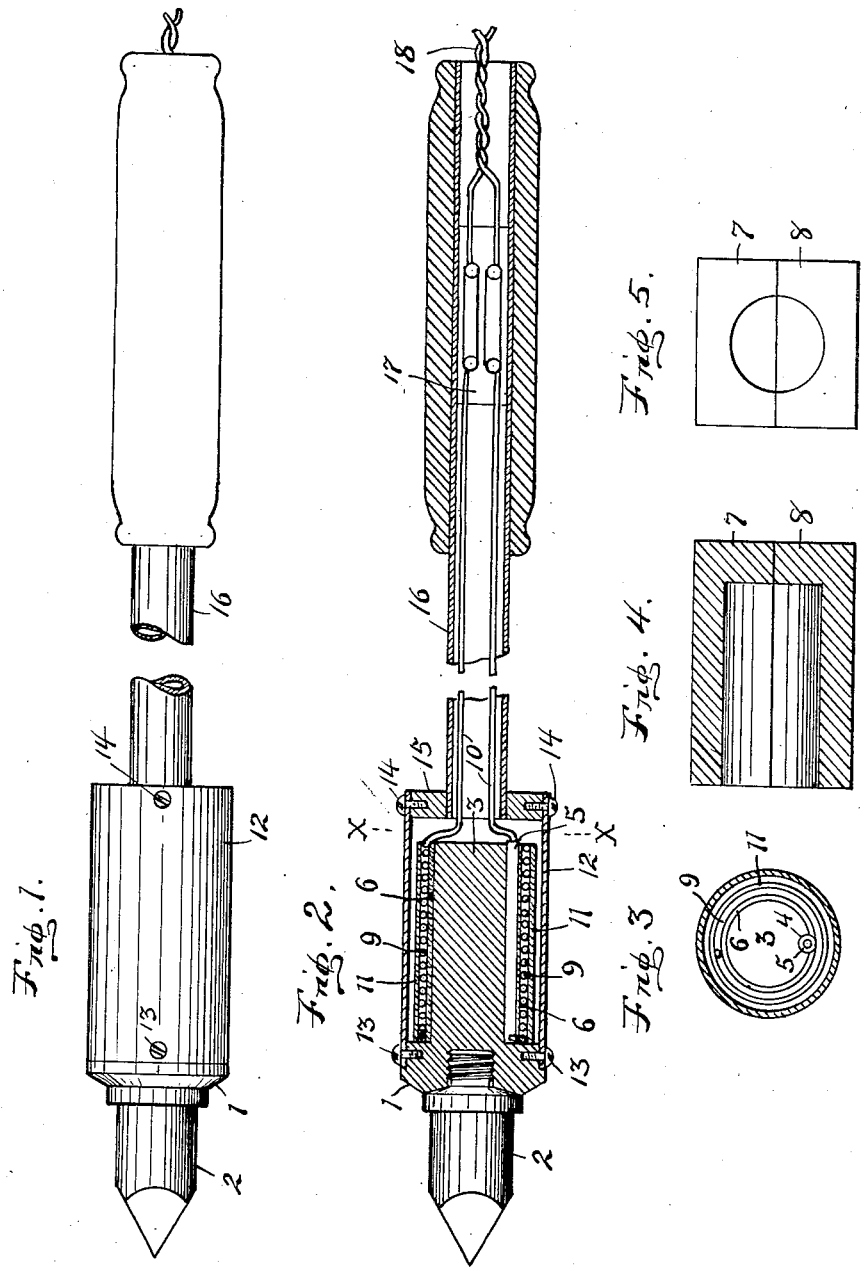

UNITED STATES PATENT OFFICE.

WILLIAM A. BRAUN, OF DOVER, OHIO.

SOLDERING-IRON.

1,293,320.  Specification of Letters Patent.  Patented Feb. 4, 1919.

Application filed June 24, 1918. Serial No. 241,509.

*To all whom it may concern:*

Be it known that I, WILLIAM A. BRAUN, a citizen of the United States of America, and resident of Dover, in the county of Tuscarawas and State of Ohio, have invented certain new and useful Improvements in Soldering-Irons, of which the following is a specification.

This invention relates to improvements in electrical soldering irons and the objects thereof are: first, is to provide a construction for electrically heated soldering irons in which a resistance coil, or heating element, is used, that may be renewed as occasion may arise because of deterioration of the coil, and second, to provide an electrically heated soldering iron so constructed that its endurance will be protracted beyond those of ordinary construction.

The objects of the invention are accomplished by the construction illustrated in the accompanying drawings in which:—

Figure 1 is a longitudinal external view of a soldering iron, embodying the invention, a part thereof being broken away;

Fig. 2 is a view of Fig. 1 shown partially in vertical central section;

Fig. 3 is a cross-sectional view of Fig. 2 on the line $x$—$x$ thereof;

Fig. 4 is a vertical central section of a mold used in forming a part of the apparatus; and Fig. 5 is an end elevation of Fig. 4.

Similar characters of reference indicate corresponding parts throughout the several views and referring now to the same:

1 is a core of metal, such as iron, copper or other heat conducting material. 2 is a detachable extending point that is screwed into the core. The core has a shank 3 of smaller diameter than its forward end and has a groove 4 made in one side thereof that extends from its rear end to its enlarged forward portion.

In the groove 4 is placed an insulating tube 5, and a stratum 6 of cement extends entirely around the core, and also embeds the tube. The cement stratum is applied to the shank by the use of a mold that is composed of two parts 7 and 8 respectively that may be separated from each other, the parts being hollowed out to receive the cement coating and the shank of the core. The cement used may be of any character found suitable for the purpose, such for example as alundum cement. In applying the cement, the mold is first lined with paper or other inflammable substance that will easily burn out when the mold is heated, and the cement is applied within the mold upon the paper lining. The shank 3 of the core together with the insulating tube 5 fitted within the groove 4 is placed within the mold, the two parts thereof being pressed together under high pressure so that the cement stratum becomes thereby compressed about the core. While thus held in place the cement is dried and baked by placing the mold with its contents in an oven. The paper lining used in the mold serves to prevent the cement from becoming attached to the mold and is easily removed after the baking process has been completed.

The heating element or resistance coil 9 is wound around the cement stratum 6, one of its terminal wires 10 extending through the insulating tube 5. An external stratum 11 of cement is then applied around the coil completely embedding the latter so as to effect complete insulation thereof. The external cement stratum is applied in the same manner as the stratum 6 by the use of molds suitably proportioned for the purpose. The baking process also is used as in the former instance.

The heating element, thus insulated and held in place upon the shank, is housed within a shell 12 that is removably attached to the enlarged head of the core by means of screws 13. The rear end of the shell is removably attached by means of screws 14 to a flange 15 that is fixed upon the end of a tubular handle 16. The terminal wires 10 of the heating element pass through the tubular handle and are connected with a terminal block 17. Feed wires 18 are also connected with the terminal block in the customary manner so that electrical energy may be supplied to the heating element.

By the construction set forth the heating element is held in place and insulated from the core without the insulating material becoming attached to the shell in which it is housed, and thus it may be easily removed and replaced in the event of its becoming defective.

What I claim is:—

1. In an electrical soldering iron, a core having an enlarged end and a shank having a longitudinal groove in the side thereof; an insulating tube situated in the groove;

a stratum of cement compressed and baked upon the core encompassing also the tube; a heating element coiled upon the core over said stratum of cement; a second stratum of cement compressed and baked upon the core external of said heating element and insulating the latter; and a removable housing attached to the core and inclosing the cement covered element.

2. In apparatus of the class described, a core; a detachable point secured thereto; a heating element coiled about the shank of the core, there being a stratum of cement compressed and baked upon the shank and insulating the coil therefrom; an insulating covering compressed and baked upon the element and forming external insulation therefor; and a housing inclosing the insulating element.

In testimony whereof I affix my signature, in presence of two witnesses.

WILLIAM A. BRAUN.

Witnesses:
 MARIE A. HARTMAN,
 MATILDA METTLER.